United States Patent
Flodman et al.

(10) Patent No.: US 6,595,748 B2
(45) Date of Patent: Jul. 22, 2003

(54) TRICHANNEL AIRFOIL LEADING EDGE COOLING

(75) Inventors: David Allen Flodman, Rowley, MA (US); Bhanu Mahasamudram Reddy, Boxford, MA (US); Mark Douglas Gledhill, Hamilton, MA (US)

(73) Assignee: General Electric Company, Schenectady, NY (US)

( * ) Notice: Subject to any disclaimer, the term of this patent is extended or adjusted under 35 U.S.C. 154(b) by 27 days.

(21) Appl. No.: 09/921,432

(22) Filed: Aug. 2, 2001

(65) Prior Publication Data

US 2003/0026698 A1 Feb. 6, 2003

(51) Int. Cl.$^7$ .................................................. F01D 5/18
(52) U.S. Cl. ...................................... 416/97 R; 415/115
(58) Field of Search ....................... 415/115; 416/96 R, 416/97 R

(56) References Cited

U.S. PATENT DOCUMENTS

| | | | |
|---|---|---|---|
| 5,193,980 A | * 3/1993 | Kaincz et al. | ............ 416/97 R |
| 5,356,265 A | 10/1994 | Kercher | .................... 416/97 R |
| 5,387,085 A | 2/1995 | Thomas, Jr. et al. | ...... 416/97 R |
| 5,498,133 A | 3/1996 | Lee | .......................... 416/97 R |
| 5,538,394 A | * 7/1996 | Inomata et al. | ........... 416/97 R |
| 5,577,884 A | 11/1996 | Mari | .................... 416/97 R X |
| 5,591,007 A | 1/1997 | Lee et al. | ................. 416/97 R |
| 5,660,524 A | 8/1997 | Lee et al. | ................. 416/97 R |
| 5,690,473 A | 11/1997 | Kercher | .................... 416/97 R |
| 5,902,093 A | 5/1999 | Liotta et al. | ............. 416/97 R |
| 6,168,381 B1 | 1/2001 | Reddy | ...................... 416/97 R |
| 6,183,198 B1 | 2/2001 | Manning et al. | .......... 416/97 R |

FOREIGN PATENT DOCUMENTS

JP     60198305 A    * 10/1985    ............. F01D/5/18

* cited by examiner

*Primary Examiner*—Edward K. Look
*Assistant Examiner*—Richard A. Edgar
(74) *Attorney, Agent, or Firm*—Nathan D. Herkamp; Francis L. Conte

(57) ABSTRACT

A turbine blade includes an airfoil having a leading edge flow chamber disposed behind a leading edge in front of a pair of side channels. The leading edge channel receives coolant from the pressure side channel in isolation from the suction side channel.

29 Claims, 5 Drawing Sheets

TRICHANNEL AIRFOIL LEADING EDGE COOLING

The US Government may have certain rights in this invention in accordance with Contract No. DAAH10-98-C-0023.

BACKGROUND OF THE INVENTION

The present invention relates generally to gas turbine engines, and, more specifically, to turbine blade cooling.

In a gas turbine engine, air is pressurized in a compressor and mixed with fuel and ignited in a combustor for generating hot combustion gases. The gases flow downstream through turbine stages which extract energy therefrom for powering the compressor and producing useful work, such as powering a fan for propelling an aircraft in flight.

A high pressure turbine is disposed immediately downstream from the combustor and receives the hottest combustion gases therefrom. The first stage turbine rotor blades have hollow airfoils which are supplied with a portion of air bled from the compressor for use as a coolant in removing heat from the blades during operation.

Each airfoil includes pressure and suction sidewalls joined together at opposite leading and trailing edges, and extending from root to tip. A platform is disposed at the airfoil root and defines a portion of the radially inner flowpath for the combustion gases. And, a dovetail is integrally joined to the platform for mounting the individual blades in corresponding dovetail slots in the perimeter of a rotor disk.

Since the airfoil leading edge first engages the hot combustion gases, it requires substantial cooling for obtaining a useful blade life. Heat load from the combustion gases varies around the outer surface of the airfoil from the leading to trailing edges, and along the pressure and suction sidewalls. Various cooling circuits are provided inside the airfoil for cooling the different portions thereof. The different portions of the airfoil therefore operate at different temperatures, which introduces thermal stress therein that affects low cycle fatigue life of the blade.

Airfoil cooling may be effected using convection cooling, film cooling, or impingement cooling, or combinations thereof. The leading edge of a first stage turbine airfoil typically includes several rows or columns of film cooling holes fed by a common leading edge flow chamber or channel. Other film cooling holes and trailing edge holes may be fed by corresponding internal channels, such as multi-pass serpentine cooling channels.

In one conventional configuration, the leading edge chamber may be fed by a single flow channel located therebehind and separated therefrom by an intervening cold rib or bridge. The cold bridge includes a row of impingement holes which direct the air coolant in impingement against the backside of the leading edge for enhanced cooling thereof. However, the air flowing through the impingement supply channel is heated as it flows therethrough which correspondingly reduces impingement cooling effectiveness at the leading edge.

Since the cold bridge is disposed inside the airfoil and is itself cooled by the coolant therein, its temperature is substantially lower than that of the sidewalls of the airfoil around the leading edge. Accordingly, significant differential thermal expansion is effected between the sidewalls and the cold bridge which in turn creates large thermal stresses which adversely affect fatigue life.

The airfoil may include additional film cooling holes disposed in either sidewall downstream of the leading edge, which are typically referred to as gill holes. Since the gill holes are typically provided with a common source of coolant inside the airfoil, and the pressure of the combustion gases outside of the airfoil varies, backflow margin across the gill holes may vary on opposite sides of the airfoil.

Backflow margin is defined as the pressure of the coolant inside the airfoil divided by the local pressure of the combustion gases outside the airfoil as experienced by each of the gill holes. Sufficient backflow margin must be maintained to prevent ingestion of the hot combustion gases into the airfoil, and ensure continuous discharge of the coolant through the gill holes.

Since the minimum required backflow margin must be set at the airfoil leading edge, the backflow margin of the lower pressure suction sidewall gill holes may be undesirably high.

Accordingly, it is desired to provide a gas turbine engine turbine blade having improved leading edge cooling which addresses one or more of these typical design problems.

BRIEF SUMMARY OF THE INVENTION

A turbine blade includes an airfoil having a leading edge flow chamber disposed behind a leading edge in front of a pair of side channels. The leading edge channel receives coolant from the pressure side channel in isolation from the suction side channel.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
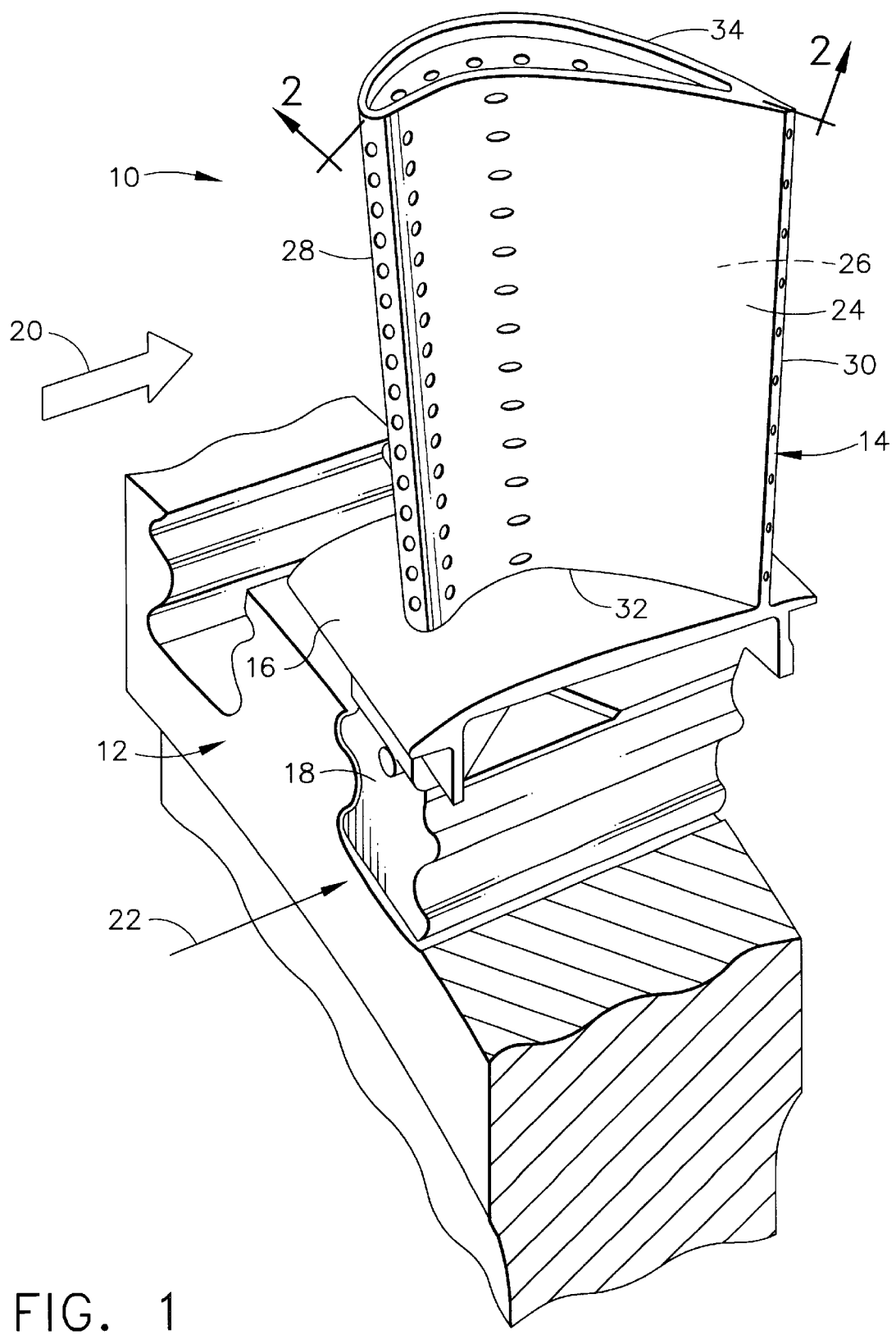
FIG. 1 is an isometric view of one of several turbine rotor blades mounted to the perimeter of a rotor disk having improved leading edge cooling in accordance with an exemplary embodiment of the present invention.

Illustrated in FIG. 1 is an exemplary first stage, high pressure turbine rotor blade 10 of a gas turbine engine, such as a turbofan engine for powering an aircraft in flight. One of several identical blades is illustrated as mounted to the perimeter of a conventional rotor disk 12 shown in applicable part.

Each blade includes an airfoil 14, a platform 16, and a dovetail 18 formed as a unitary or one-piece component such as by casting. The airfoil 14 has any suitable profile for extracting energy from hot combustion gases 20 for rotating the disk 12 around an axial centerline axis during operation. The platform 16 defines a portion of the inner flowpath for the combustion gases. And, the dovetail has any suitable configuration which matches a complementary dovetail slot formed in the perimeter of the rotor disk for being retained therein.

The airfoil 14 is hollow, and receives air 22 suitably bled from a compressor (not shown) and channeled thereto through the blade dovetails in any conventional manner.

The airfoil 14 includes a first or pressure sidewall 24 which is generally concave, and a circumferentially opposite second or suction sidewall 26 which is generally convex. The sidewalls have a suitable aerodynamic crescent profile joined together at axially or chordally opposite leading and trailing edges 28,30, and are spaced apart therebetween. The sidewalls extend radially or longitudinally from a root 32 of the airfoil to a radially outer tip 34.

Figure 2:
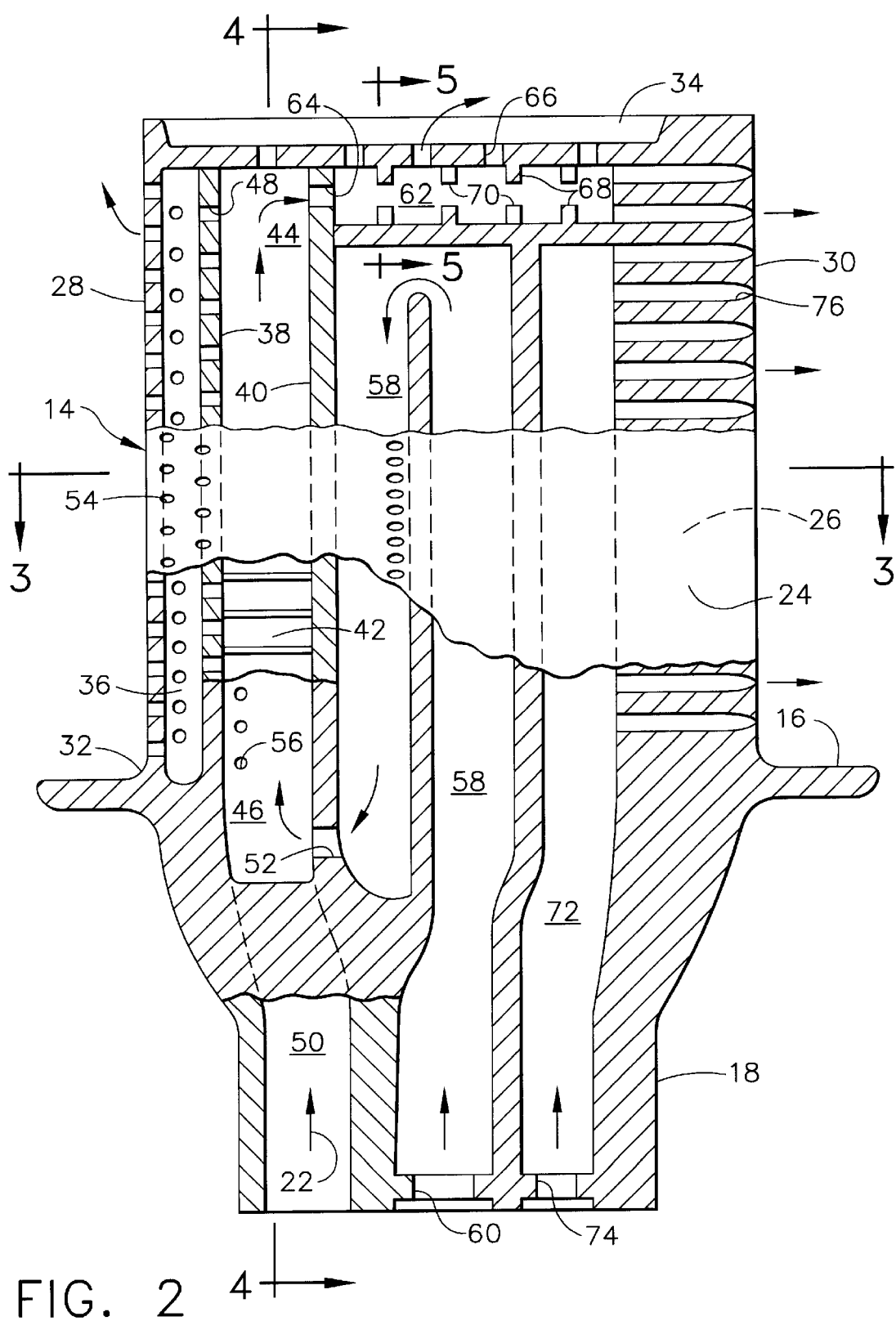
FIG. 2 is a partly sectional, elevational view through the turbine blade illustrated in FIG. 1 and taken along line 2—2, and illustrates trichannel leading edge impingement cooling in accordance with an exemplary embodiment of the present invention.
Figure 3:
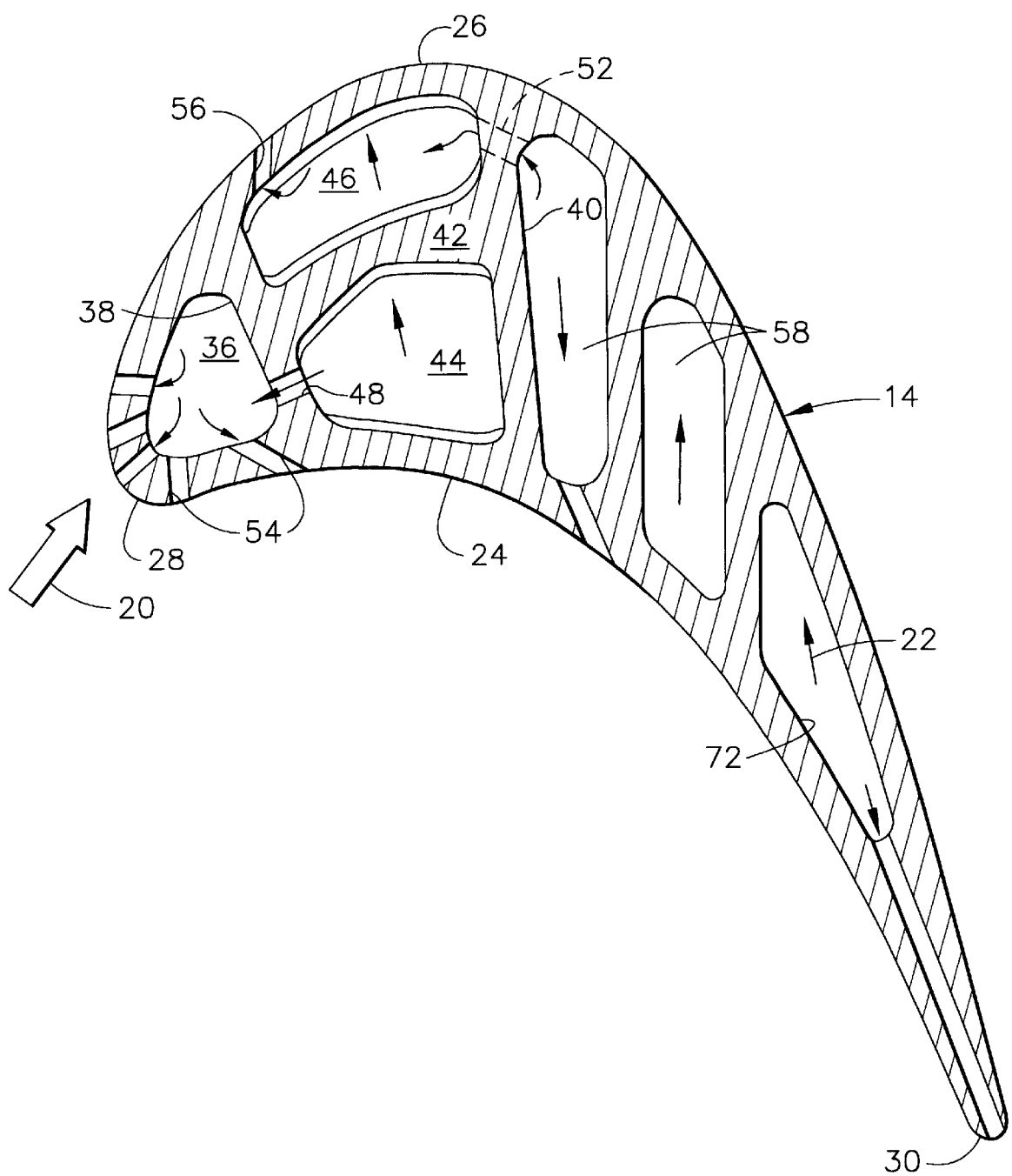
FIG. 3 is a radial sectional view through the airfoil illustrated in FIG. 2 and taken along line 3—3.

The airfoil is illustrated in more particularity in FIGS. 2 and 3 and includes a leading edge flow channel or chamber 36 disposed between the sidewalls and directly behind the leading edge. In accordance with the present invention, the leading edge chamber 36 is isolated from the remainder of the airfoil by a forward rib or bridge 38 which extends in radial span integrally between the two sidewalls 24,26 to bound the aft end of the chamber 36.

An aft rib or bridge 40 is spaced aft from the forward bridge and similarly extends in radial span transversely between the two sidewalls 24,26 and integrally therewith. An imperforate axial bridge or septum 42 extends chordally between the two bridges 38,40, and is spaced inboard from the two sidewalls 24,26 to define a first side channel 44 along the pressure sidewall 24, and a second side channel 46 along the suction sidewall 26.

The forward bridge 38 includes a plurality of feed holes 48 extending chordally therethrough, and arranged in a longitudinal row or column. The feed holes 48 are disposed in flow communication between the first side channel 44 and the leading edge chamber 36 for channeling a portion of the air coolant 22 therethrough.

As best shown in FIG. 3, both end bridges 38,40 extend laterally or circumferentially between the two opposite sidewalls 24,26 in an integral casting therewith. The septum 42 is disposed near the middle of each of the two end bridges 38,40.

Accordingly, one side of the forward bridge 38 defines the aft end of the leading edge chamber 36. The opposite side of the forward bridge defines the forward ends of the two side channels 44,46. Similarly, one side of the aft bridge 40 faces the trailing edge, and the opposite side of the aft bridge defines the aft ends of the two side channels.

Whereas the feed holes 48 extend through the pressure-side of the forward bridge to channel the coolant into the leading edge chamber from the first side channel 44, the suction-side of the forward bridge is imperforate between the leading edge chamber and the second side channel 46. In this way, the septum 42 isolates the two side channels from each other directly behind the leading edge chamber, and improves blade cooling and fatigue life, especially in a relatively small blade formed by investment casting.

Investment casting is a conventional method for forming turbine airfoils with intricate cooling channels therein. The casting method uses ceramic cores which define the cooling flow channels. However, those cores are brittle and have minimum acceptable sizes suitable for use without breaking during the casting process.

The two side channels 44,46 are each comparable in size with the other flow channels of the airfoil, and may be defined by correspondingly sized ceramic cores of suitable strength for the casting process. In this way, the airfoil leading edge region with the trichannels 36,44,46 may be economically investment cast in relatively small sizes, yet with enhanced cooling performance and life.

Figure 4:
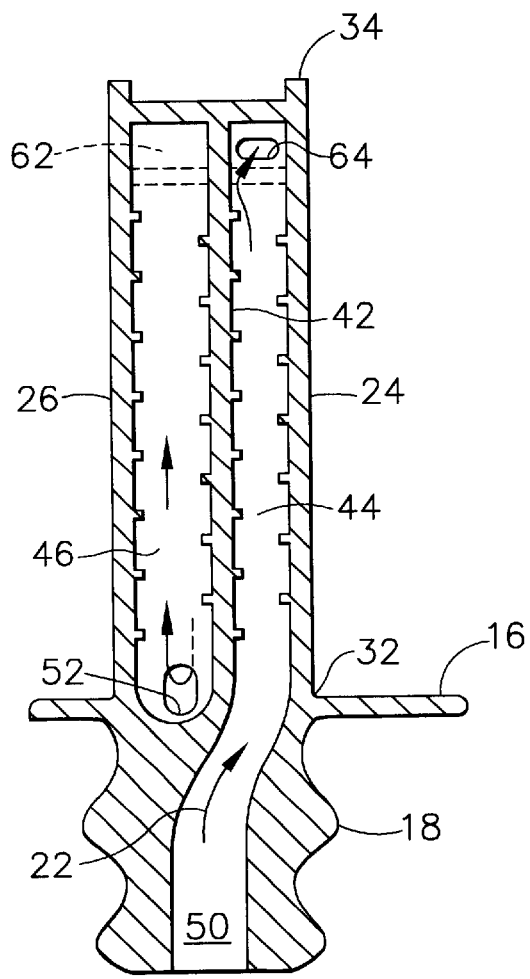
FIG. 4 is an elevational sectional view of the turbine blade illustrated in FIG. 2 and taken along line 4—4.

As shown in FIGS. 2 and 4, the first side channel 44 preferably extends the full longitudinal height of the blade, and includes a first inlet 50 at the bottom thereof at the entrance to the dovetail 18. The second side channel 46 extends longitudinally for the fall radial height or span of the airfoil, and includes at its bottom a second inlet 52 preferably disposed near the platform. Both inlets 50,52 are disposed below the blade root for channeling the coolant 22 radially outwardly through the two side channels in the preferred embodiment illustrated.

As shown in FIGS. 2 and 3, the coolant 22 flows radially outwardly through the two side channels and is suitably discharged therefrom. The row of feed holes 48 provides respective outlets for the first side channel which feed the coolant into the leading edge chamber 36 over its entire longitudinal height from root to tip of the airfoil.

A plurality of film cooling holes 54 extend through one or both of the sidewalls 24,26 near or around the leading edge 28 in one or more longitudinal rows, such as the five exemplary rows illustrated. The film cooling holes 54 may have any conventional form and are disposed in flow communication with the leading edge chamber 36 for discharging the coolant therefrom to form respective films of cooling air over the outer surface of the airfoil for protection against the hot combustion gases 20 which flow thereover during operation.

Additional film cooling holes may be disposed aft of the airfoil leading edge for providing additional film cooling in any suitable manner. For example, a row of suction-side, film cooling gill holes 56 are preferably disposed through the suction side wall 26 in flow communication with the second side channel 46 for discharging the coolant therefrom in a film of cooling air over the outer surface of the airfoil.

In the preferred embodiment illustrated in FIGS. 2 and 3, the feed holes 48 face the back or inner side of the leading edge 28 generally normal thereto for directing the coolant in impingement thereagainst. The configuration of the leading edge chamber 36 with impingement and film cooling of the leading edge may take any conventional form. However, by isolating the first side channel 44 from the second side channel 46, and using the second side channel to thermally insulate the first side channel from the heat along the suction sidewall, substantial improvements in performance may be obtained over conventional impingement cooling.

Most significantly, since the coolant channeled inside the first side channel 44 is protected from being heated from the suction side of the airfoil, it provides lower temperature cooling air for impingement of the leading edge for improving the cooling thereof. Nevertheless, the coolant flowing through the two side channels 44, 46 is heated during operation by heat transfer from the corresponding pressure and suction sidewalls, and in turn heats the septum 42 and the two bridges 38,40 joined thereto.

Since the septum intersects the two bridges, those bridges have less surface area exposed to the coolant in the two side channels, and will operate warmer.

The hotter coolant in the suction-side channel 46 may be used to additional advantage to heat the forward bridge 38 during operation, notwithstanding the lower temperature coolant channeled through the pressure-side channel 44 and feed holes 48. Since the suction-side channel directly engages the forward bridge 38 at its forward end, and since the gill holes 56 are preferably disposed aft of the forward bridge 38, the forward bridge is further warmed by the heated coolant channeled through the side channels and by the external combustion gases. This creates an effective warm forward bridge 38 which decreases the differential temperature with the airfoil around its leading edge for correspondingly reducing thermally induced stress therein for further enhancing fatigue life of the blade.

Additional heating of the forward bridge 38 may be effected in accordance with a preferred embodiment of the present invention as initially illustrated in FIGS. 2 and 3. In this embodiment, a serpentine mid flow channel 58 is disposed between the aft bridge 40 and the trailing edge 30 and terminates in flow communication with the second inlet 52 for discharging into the corresponding suction-side second channel 46 preheated coolant as it extracts heat from the aft portion of the airfoil during operation.

The mid channel 58 is preferably a multi-pass serpentine channel having any conventional configuration. For example, the mid channel includes a first pass or leg which begins at a metered inlet 60 at the bottom of the dovetail 18 and extends longitudinally toward the airfoil tip and then turns radially inwardly in a second pass or leg which terminates below the airfoil root near the blade platform.

The second pass of the mid channel terminates at the bottom of the aft bridge 40 in flow communication with the second inlet 52 as illustrated in more detail in FIGS. 2 and 4. In this way, the coolant is preheated as it flows through the airfoil in the first two passes of the serpentine channel to provide preheated coolant to the second side channel 46. And, that second side channel then defines a third pass or leg of the serpentine channel which extends radially outwardly to the airfoil tip as the last pass.

This serpentine configuration offers yet additional advantages. The coolant is discharged from the second side channel 46 through the gill holes 56 illustrated in FIGS. 2 and 3. Since the pressure of the combustion gases over the pressure sidewall is greater than the pressure of the gases over the suction sidewall, the second inlet 52 may be preferably sized smaller in flow area than the first inlet 50 for metering the coolant to the suction-side second channel 46 at a reduced pressure to correspondingly reduce the pressure and backflow margin of the coolant at the suction side gill holes 56.

Correspondingly, the first inlet 50 is preferably sized as large as practical for minimizing pressure losses therethrough for ensuring maximum backflow margin across the film cooling holes 54 fed by the leading edge chamber 36. In this way, the suction side gill holes 56 are isolated from the leading edge film cooling holes 54, with each set of holes having a dedicated coolant source with controlled pressure for tailoring the backflow margins as required, and better utilize the limited amount of coolant available.

An additional advantage may be obtained from using the first side channel 44, as initially illustrated in FIG. 2. The blade tip 34 is also subjected to the hot combustion gases as they flow thereover during operation. Near the end of blade life, oxidation may remove material from the blade tip and cracks may initiate in the tip and propagate radially inwardly.

The growth of such cracks may be arrested or minimized by introducing a chordally extending tip chamber 62 disposed directly below or under the airfoil tip 34 which defines the cap or ceiling enclosing the top of the airfoil. The tip chamber is defined in lower part by an axial rib or floor which extends from the aft bridge 40 to the trailing edge 30.

As shown in FIGS. 2 and 4, the aft bridge includes an outlet hole 64 at the radially outer end thereof disposed in flow communication between the first side channel 44 and the tip chamber 62 for channeling the coolant thereto. The airfoil tip preferably includes a plurality of tip holes 66 from which a portion of the coolant may be discharged from the tip chamber radially outwardly above the airfoil tip.

The outlet hole 64 provides relatively low temperature coolant from the first side channel 44 to feed the tip chamber 62 for enhanced cooling of this region. The tip chamber and the enhanced cooling thereof are effective for arresting crack growth propagating radially inwardly from the airfoil tip during operation. And, the tip chamber isolates the several cooling channels or circuits of the airfoil from the tip to prevent short circuiting of the coolant supply for maintaining effective cooling of the airfoil notwithstanding tip cracks in this region.

In the preferred embodiment, the outlet hole 64 is sized to meter the coolant to the tip chamber 62. In this way, tip cracks, oxidation, or tip damage due to rubbing with the surrounding shroud will not significantly increase the amount of air discharged from the tip chamber, and such metering will maintain effective cooling of the remainder of the blade.

Figure 5:
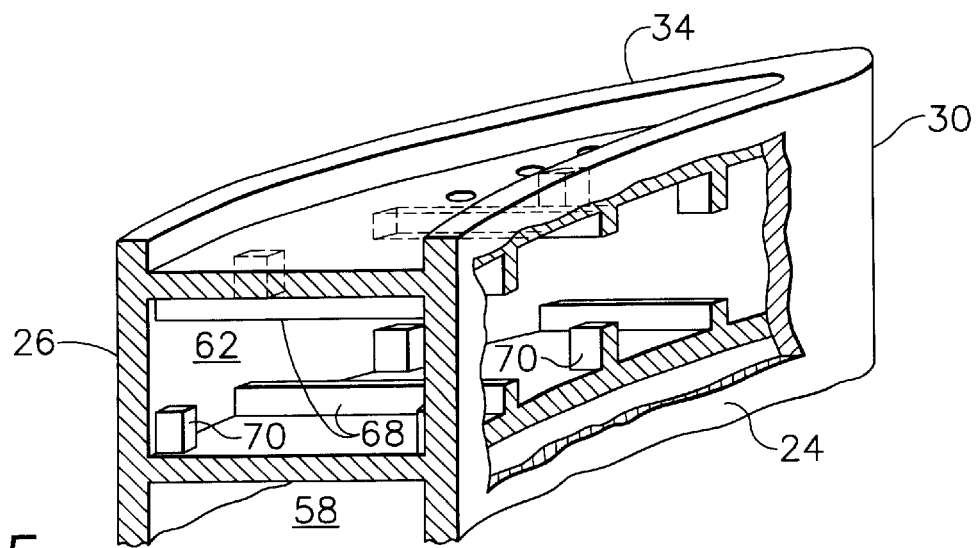
FIG. 5 is an isometric, elevational, partly sectional view of the tip cooling chamber of the turbine blade illustrated in FIG. 2 and taken generally along line 5—5.

As shown in FIGS. 2 and 5, the tip chamber 62 includes a specific combination of turbulators for enhancing cooling thereof in the limited flow volume available therefor. A plurality of turbulator ribs 68 extend transversely between the two sidewalls 24,26 and integral therewith. The ribs alternate chordally between the ceiling and floor of the tip chamber, and extend in limited height therefrom to minimize pressure losses.

Preferably cooperating with the transverse ribs 68 are respective pluralities of side turbulator pins 70, or short ribs, extending from the inner surfaces of the two sidewalls 24,26.

The side pins 70 are preferably arranged in pairs coplanar with respective ones of the transverse ribs 68. In this way, as the transverse ribs alternate between the ceiling and floor, the pins 70 also alternate in position bridging the sidewalls with the floor and ceiling, respectively.

As shown in FIG. 2, the airfoil may also include an independent trailing edge flow channel 72 extending radially from a metered inlet 74 at the base of the dovetail to a radially outer end below the tip chamber 62. A row of conventional trailing edge discharge holes 76 are disposed in flow communication with the channel 72 for discharging the coolant therethrough for cooling the trailing edge region of the airfoil.

The airfoil, therefore, includes the leading edge chamber 36, the two side channels 44,46, the serpentine channel 58, and lastly, the trailing edge channel 72 between the serpentine channel 58 and the trailing edge 30.

Those various channels may be provided with the coolant through the blade dovetail in many configurations which affect overall cooling performance of the airfoil. For example, FIG. 2 illustrates that the first side channel 44, serpentine channel 58, and trailing edge channel 72 have independent inlets 50,60,74.

Maximum coolant pressure is desired for cooling the leading edge with maximum backflow margin, and therefore, the first inlet 50 is as large as practical, without metering which would otherwise reduce the available pressure. The two inlets 60,74 are preferably metered to reduce pressure and flowrates in cooling the airfoil aft of the leading edge, and better match the lower heat input thereat and external gas pressure.

Figure 6:
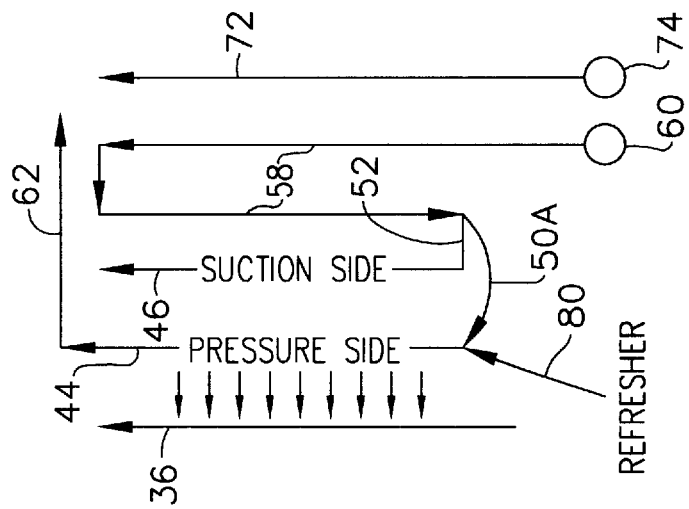
FIG. 6 is a schematic representation of the turbine blade illustrated in FIG. 2 in accordance with another embodiment of the invention.

FIG. 6 illustrates schematically an alternate configuration of the cooling configuration illustrated in FIG. 2. The first inlet 50 is eliminated, and all cooling air enters through the two remaining inlets 60,74. In order to feed the first side channel 44, the first inlet 50A is relocated between the root end of the first side channel 44 and the second leg of the serpentine channel 58, in a manner similar to that of the second inlet 52. In this way, both side channels 44,46 are disposed in flow communication with the serpentine channel for receiving the coolant therefrom.

Figure 7:
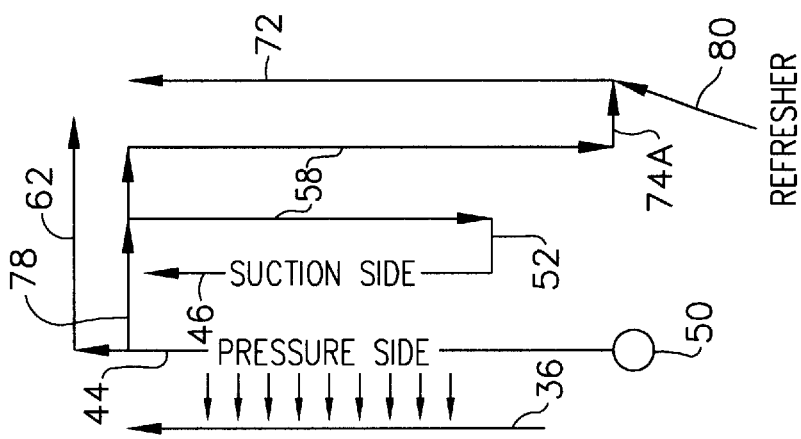
FIG. 7 is a schematic representation of the turbine blade illustrated in FIG. 2 in accordance with another embodiment of the invention.

FIG. 7 illustrates schematically an alternate configuration of the cooling configuration illustrated in FIG. 2. The two inlets 60,74 are eliminated, and all cooling air enters through the single remaining first inlet 50. In order to feed the serpentine channel 58, an auxiliary inlet 78 is introduced between the top of the first side channel 44 and the bend between the two legs of the serpentine channel for providing flow communication therebetween and receiving coolant from the common first inlet 50.

In order to feed the trailing edge channel 72, the trailing edge inlet 74A is relocated to join the bottom of the adjoining leg of the serpentine channel for providing flow communication therebetween and receiving coolant therefrom.

Figure 8:
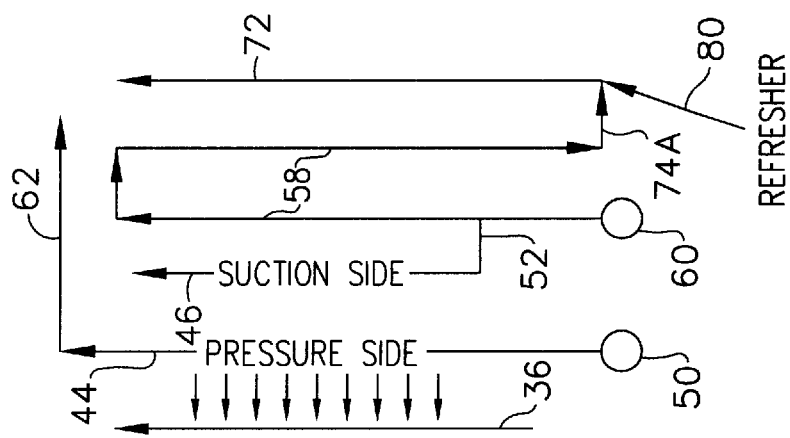
FIG. 8 is a schematic representation of the turbine blade illustrated in FIG. 2 in accordance with another embodiment of the invention.

FIG. 8 illustrates schematically an alternate configuration of the cooling configuration illustrated in FIG. 2. The trailing edge inlet 74 is eliminated, and all cooling air enters through the two remaining inlets 50,60. In order to feed the trailing edge channel 72, the trailing edge inlet 74A is relocated to join the bottom of the adjoining leg of the serpentine channel 58 for providing flow communication therebetween and receiving coolant therefrom.

The four embodiments illustrated in FIGS. 2, 6, 7, and 8 share common cooling channels, yet with different supply of the coolant through the dovetail. In FIGS. 2, 7, and 8, the leading edge chamber 36 is similarly supplied with coolant from a dedicated inlet 50 for maximum cooling thereof. In FIGS. 7 and 8, the serpentine and trailing edge channels are joined together and supplied with coolant in different manners for best matching the external heat load for the particular design.

In FIG. 6, the serpentine and trailing edge channels 58,72 are separately provided with dedicated inlets, while the leading edge shares air from the serpentine channel for an embodiment requiring less cooling of the leading edge.

And, in the three embodiments of FIGS. 6–8, an additional refresher hole 80 may be selectively introduced through the dovetail for providing an auxiliary flow passage substantially smaller than the previous inlets being eliminated. In this way, the refresher hole 80 in FIG. 6 joins the first side channel 44 to introduce a corresponding small flowrate of refresher coolant thereto. In FIGS. 7 and 8, the refresher hole 80 joins the trailing edge channel 72 to selectively introduce the refresher air thereto.

The trichannel 36,44,46 configuration of the airfoil leading edge region provides many benefits in improving performance of a gas turbine engine turbine blade. These benefits include reducing the leading edge temperature while increasing the forward bridge temperature; reducing the amount of air used as film from the gill holes on the airfoil suction side; increasing the coverage of that suction side cooling film; and decreasing the trailing edge temperatures without increasing flow in the trailing edge channel itself. And, the trichannels may be configured for relatively small first stage high pressure turbine blades, and investment cast in a conventional manner with suitably sized ceramic cores without concern for increased risk of core breakage.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims in which we claim:

1. A turbine blade comprising:
   airfoil pressure and suction sidewalls joined together at leading and trailing edges and extending from a root to tip;
   a leading edge flow chamber disposed between said sidewalls behind said leading edge, and bounded by a forward bridge extending between said sidewalls;
   an aft bridge spaced from said forward bridge and extending between said sidewalls;
   a septum extending chordally between said forward and aft bridges and spaced inboard from said sidewalls to define a first side channel along said pressure sidewall and a second side channel along said suction sidewall; and
   a row of feed holes disposed through said forward bridge in flow communication between said first side channel and said leading edge chamber for channeling a coolant therethrough;
   a row of film cooling gill holes disposed through said suction sidewall in flow communication with said second side channel; and
   said first and second side channels have respective first and second inlets disposed below said blade root, and said second inlet is sized for metering said coolant to said second side channel at a reduced pressure to reduce backflow margin at said gill holes.

2. A turbine blade comprising:
   airfoil pressure and suction sidewalls joined together at leading and trailing edges and extending from a root to tip;
   a leading edge flow chamber disposed between said sidewalls behind said leading edge, and bounded by a forward bridge extending between said sidewalls;
   an aft bridge spaced from said forward bridge and extending between said sidewalls;
   a septum extending chordally between said forward and aft bridges and spaced inboard from said sidewalls to define a first side channel along said pressure sidewall and a second side channel along said suction sidewall;
   a row of feed holes disposed through said forward bridge in flow communication between said first side channel and said leading edge chamber for channeling a coolant therethrough; and
   said forward bridge is imperforate between said leading edge chamber and said second side channel.

3. A blade according to claim 2 wherein said septum is disposed near the middle of each of said forward and aft bridges.

4. A blade according to claim 3 wherein said septum is imperforate between said first side channel and said second side channel to isolate said first side channel from said second side channel.

5. A blade according to claim 3 wherein said feed holes face a back side of said leading edge for directing said coolant in impingement thereagainst.

6. A blade according to claim 5 further comprising a row of film cooling holes extending through one of said sidewalls near said leading edge, and disposed in flow communication with said leading edge chamber for discharging said coolant therefrom.

7. A blade according to claim 6 further comprising a row of film cooling gill holes disposed through said suction sidewall in flow communication with said second side channel.

8. A blade according to claim 7 wherein said first and second side channels have respective first and second inlets disposed below said blade root.

9. A blade according to claim 8 further comprising a mid flow channel disposed between said aft bridge and trailing edge, and terminating in flow communication with said second inlet for discharging thereto said coolant.

10. A blade according to claim 9 wherein said mid flow channel is a serpentine flow channel and said second side channel defines a last pass thereof.

11. A blade according to claim 10 further comprising a trailing edge cooling channel disposed between said serpentine channel and said trailing edge.

12. A blade according to claim 11 wherein both said first and second side channels are disposed in flow communication with said serpentine channel for receiving coolant therefrom.

13. A blade according to claim 11 wherein said trailing edge channel is disposed in flow communication with said serpentine channel for receiving coolant therefrom.

14. A blade according to claim 11 wherein said first side channel, serpentine channel, and trailing edge channel have independent inlets.

15. A blade according to claim 14 wherein said inlets of said serpentine channel and trailing edge channel are sized for metering coolant flow therethrough.

16. A blade according to claim 11 wherein said serpentine channel is disposed in flow communication with said first side channel for receiving coolant therefrom.

17. A blade according to claim 16 wherein said trailing edge channel is disposed in flow communication with said serpentine channel for receiving coolant therefrom.

18. A blade according to claim 8 further comprising a tip chamber disposed under said blade tip and extending from said aft bridge to said trailing edge, with said aft bridge including an outlet hole disposed in flow communication between said first side channel and said tip chamber for channeling said coolant thereto.

19. A blade according to claim 18 wherein said outlet hole is sized for metering coolant to said tip chamber.

20. A blade according to claim 19 wherein said tip chamber includes turbulator ribs alternating between a ceiling and floor thereof.

21. A blade according to claim 20 wherein said tip chamber further includes turbulator pins extending from inner surfaces of said pressure and suction sidewalls.

22. A blade according to claim 21 wherein said turbulator pins are coplanar with respective ones of said turbulator ribs.

23. A turbine blade comprising:

airfoil pressure and suction sidewalls joined together at leading and trailing edges and extending from a root to tip;

a leading edge flow chamber disposed between said sidewalls behind said leading edge, and bounded by a forward bridge extending between said sidewalls;

an aft bridge spaced from said forward bridge and extending between said sidewalls;

a septum extending chordally between said forward and aft bridges and spaced inboard from said sidewalls to define a first side channel along said pressure sidewall and a second side channel along said suction sidewall;

a row of feed holes disposed through said forward bridge in flow communication between said first side channel and said leading edge chamber for channeling a coolant therethrough;

a serpentine mid flow channel disposed between said aft bridge and trailing edge, and terminating in flow communication with said second side channel for a last pass thereof;

a trailing edge cooling channel disposed between said serpentine channel and said trailing edge; and a tip chamber disposed under said blade tip and extending from said aft bridge to said trailing edge, with said aft bridge including an outlet hole disposed in flow communication between said first side channel and said tip chamber for channeling said coolant thereto.

24. A blade according to claim 23 wherein said septum is disposed near the middle of each of said forward and aft bridges, and said forward bridge is imperforate between said leading edge chamber and said second side channel.

25. A blade according to claim 24 wherein said feed holes face a back side of said leading edge for directing said coolant in impingement thereagainst, and further comprising:

a row of film cooling holes extending through said pressure sidewall near said leading edge, and disposed in flow communication with said leading edge chamber for discharging said coolant therefrom; and a row of film cooling gill holes disposed through said suction sidewall in flow communication with said second side channel.

26. A blade according to claim 25 wherein said first and second side channels have respective first and second inlets disposed below said blade root.

27. A blade according to claim 26 wherein said first side channel, serpentine channel, and trailing edge channel have independent inlets.

28. A blade according to claim 27 wherein said inlets of said serpentine channel and trailing edge channel are sized for metering coolant flow therethrough.

29. A blade according to claim 28 wherein:

said second inlet is sized for metering said coolant to said second side channel at a reduced pressure to reduce backflow margin at said gill holes; and said outlet hole is sized for metering coolant to said tip chamber.

* * * * *